Aug. 27, 1963    R. W. BENSON ETAL    3,101,608
METHOD AND APPARATUS FOR STRESS ANALYSIS
Filed Feb. 18, 1959    2 Sheets-Sheet 1
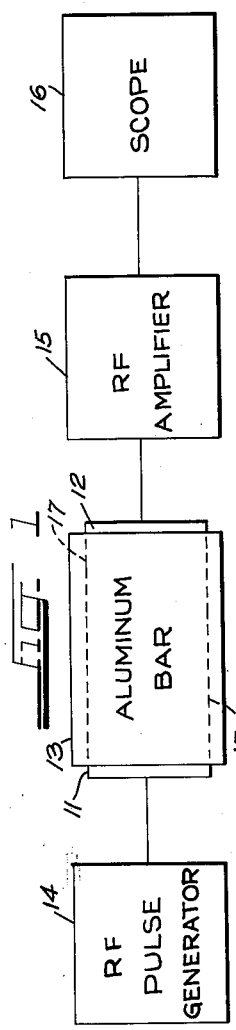
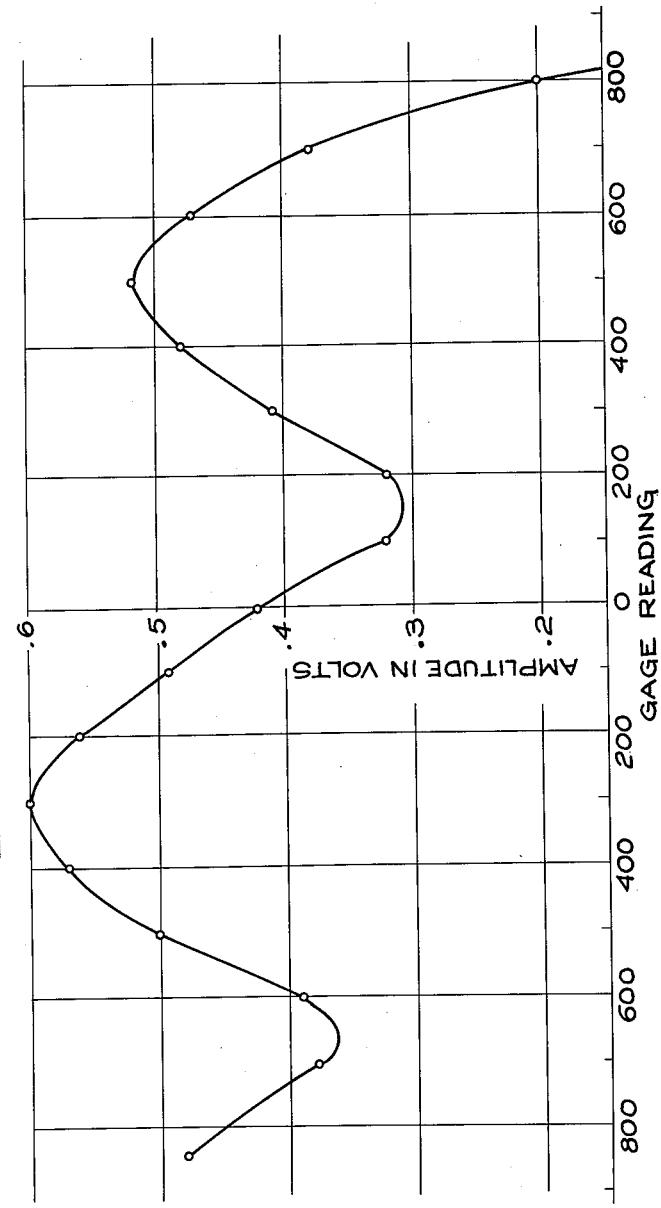
INVENTORS:
ROBERT W. BENSON
VERNER J. RAELSON
BY

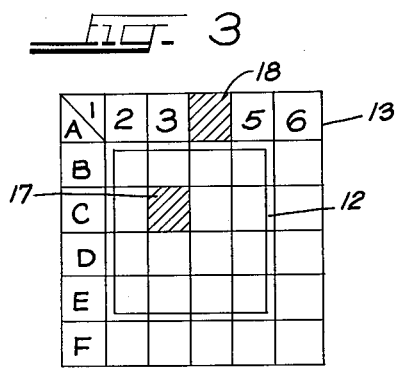
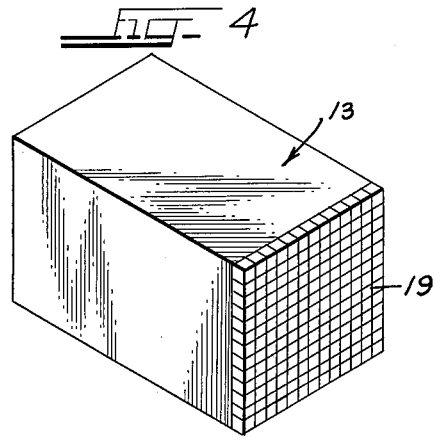
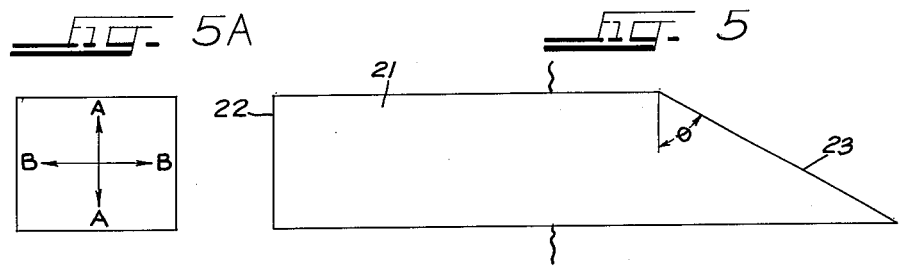
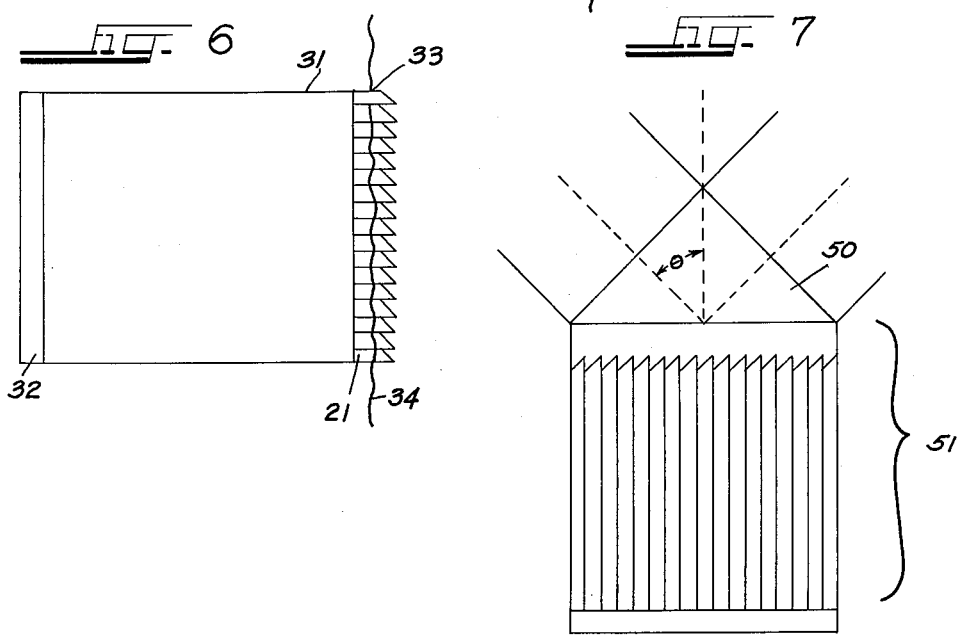
INVENTORS:
ROBERT W. BENSON
VERNER J. RAELSON

United States Patent Office 3,101,608
Patented Aug. 27, 1963

3,101,608
METHOD AND APPARATUS FOR STRESS ANALYSIS
Robert W. Benson, Oak Park, Ill., and Verner J. Raelson, Valparaiso, Ind., assignors to Armour Research Foundation of Illinois Institute of Technology, Chicago, Ill., a corporation of Illinois
Filed Feb. 18, 1959, Ser. No. 794,153
7 Claims. (Cl. 73—67.5)

This invention relates to a novel method and related apparatus for determining stress conditions in solid bodies, and more particularly relates to both the determination of stress patterns within such bodies and to the relative quantitative measurement of such stress. Even more specifically, it relates to a method which employs polarized, transverse ultrasonic waves for such determinations.

It is well known among those skilled in this art that all presently available techniques and processes for stress analysis still leaves something to be desired in one respect or another. In most instances such techniques, including the widely used photoelasticity procedures, are for laboratory use only and the need remains for methods and apparatus which are useful in actual stress testing in the field under conditions of use, or under dynamic situations. For example, a steel beam which serves as a component of an overall structure may be considered to exemplify the problems facing those engaged in this field. Not only is such beam subjected to stress in its installed position, but further it most likely is stressed in some respects as a result of its initial fabrication. At the present time, in accordance with known techniques any assumptions concerning the behavior of such beam under dynamic conditions must be made from information based upon laboratory experiments and/or theoretical calculations. A further shortcoming of the prior art stems from the fact that even the laboratory experiments provide information only on transparent plastic models which may or may not behave similarly to the actual structure, particularly when such structure is dynamically loaded.

In distinction to the teachings of the prior art the present invention is directed to a method and related apparatus for stress analysis which removes such analysis from the laboratory to provide for practical applications where needed under actual field conditions. This, of course, is not meant to imply that the instant devices cannot be used in experimental analyses, but only that their range of usefulness extends beyond this. In accordance with the teachings of our invention a system is disclosed which is non-destructive and which may be utilized in the actual stress testing of structural materials under dynamic conditions. While it is visualized that such system will find primary use in testing various metals it should be clearly understood that any solid material may be stress tested as herein taught since such materials possess the property of elasticity to shear. Furthermore, not only does the instant invention provide a means for stress analysis but it likewise permits the observation of residual stresses within such solid materials and provides for the determination thereof in an absolute, quantitative manner.

In view of the foregoing discussion, a primary object of our invention is to provide a novel method and related apparatus for stress analysis which employ ultrasonic shear waves.

Another object of our invention is to provide a non-destructive process for the measurement of stress in solid bodies under dynamic conditions.

A further object of our invention is to provide a method of measuring residual stresses in actual structural materials rather than in models thereof.

Another object of our invention is to provide a method for stress analysis wherein the character of the stress pattern in the medium being analyzed is contained in the variation of the state of polarization of polarized ultrasonic signal or wave front passed through such medium as it emerges from the region of stress.

A specific object of our invention is to provide a method for stress analysis which utilizes the reaction of stress upon transverse ultrasonic waves.

Another specific object of our invention is to provide the ultrasonic apparatus and related equipment for use in the practice of the instant process.

Still another object of our invention is to provide a method for the absolute determination of stress.

Another object of our invention is to provide novel means for the conversion of transverse ultrasonic waves into an optical image and more particularly for such conversion when such waves have passed through a stressed solid body to provide a visual stress pattern.

Other objects, features and advantages of our invention will become apparent to those skilled in this particular art from the following detailed disclosure thereof particularly when taken in conjunction with the accompanying drawings in which:

FIGURE 1 is a schematic block diagram of the basic components of the instant invention;

FIGURE 2 is a graph indicating the relationship of applied stress to ultrasonically generated voltages;

FIGURE 3 schematically illustrates the determination of stress areas in accord herewith;

FIGURE 4 schematically discloses a mosaic ultrasonic-signal receiving plate;

FIGURE 5 is a diagrammatic side view of a single unit forming an acoustical-optical image converter;

FIGURE 5A is a left-end view of FIGURE 5;

FIGURE 6 schematically discloses such acoustical-optical image converter in operation; and FIGURE 7 schematically discloses a means of determining stress-induced changes in refractive index.

Before considering the operational details of our invention an important definition as used in the present specification and claims and the basic principles hereof should be briefly considered:

First of all, as classically defined and as used herein, by a transverse wave, or shear wave as it is sometimes termed, is meant a wave in which the media moves transversely to the direction of propagation of the wave. In even more general terms, shear waves may be generated by the application of a shearing force to the face of a material as for example by oscillatory motions parallel with the face of such material.

By the use of Y-cut quartz crystals, for example, coupled with or pressed against a solid it is possible to introduce into such solid an acoustic ray in which the motion of the material medium is transverse to the direction of the propagation of the wave. Such phenomena likewise occurs with the use of various other piezoelectric crystals and other materials, and in the present specification and claims are encompassed all means of imparting such transverse ultrasonic waves to a test medium. Since the greatest part of the energy of the crystal is confined to an oscillation in shear in one preferred direction the resulting acoustic wave in the solid is polarized in the sense that the motion of the medium is substantially entirely in the same preferred direction. If the solid is a metal, the use with which our invention is preferred, the absorption of the energy of the wave within the medium is quite small and thus it is possible to introduce into a metallic object energy in the form of a transverse polarized acoustic wave to which the object is extremely transparent.

Of critical importance to the present disclosure is the fact that the velocity of the acoustic wave can be altered by the presence of stress in the medium through which it passes and such alteration in velocity results in a variation in the state of polarization of the wave as it passes through the medium. The explanation for such phenomena is as follows: We may represent the motion of the medium at a point by a vector, the displacement vector, whose instantaneous value gives the displacement of the medium from its position of equilibrium. If the acoustic wave is plane polarized then such vector always points in a fixed direction whereas if such wave is circularly polarized the end of the vector describes a circle of constant radius as the wave passes therethrough. Thus the motion of the medium, as the wave passes at a given point is describable by the specification of the variation with time of this displacement vector. Equally well, we may describe such motion by the specification of the variation with time of the two components of the displacement vector in each of two mutually perpendicular directions. A suitable choice for two such directions in a medium under stress would be the direction of the principal axes of stress. The latter are the two directions at a point in which the stress is a maximum or a minimum. Then, if the displacements caused by the wave are infinitesimal, as will be the case in all questions of interest in the present invention, the magnitude of each component of the displacement vector is representable by the expression of the form $$\alpha = A \sin w(t - x/c + B)$$

where $x$ is the distance of the point of interest (the path length) along the direction of propagation of the wave, $c$ is the velocity of the wave associated with the given component A, is the amplitude of motion, $\alpha$ is the instantaneous value of the component displacement, $t$ is the time, $w$ the angular frequency and B is a constant. When the medium is isotropic in all its properties so that such wave velocity is the same for both components then the difference for the expression $w(t-x/c+B)$, called the total phase, for the two components is constant for all values of $x$ and for all of $t$. As a consequence, the time variation of the displacement vector, the vector sum of the two components, is the same at all points $x$. That is to say the polarization of the wave remains constant with $x$. If for any reason the value of $c$ for the two components should be different then this difference in total phase will depend upon $x$. This results in a change with $x$ of the time variation of the displacement vector and thus the polarization of the wave will be changed. Since the velocity, $c$, depends upon the elasticity of the medium in the $x$ direction of the axis of stress and if the values of the latter depend upon the magnitude of the stress, it follows that the velocity of the wave will be different for the two components of the displacement vector when such tested body is under stress. As a consequence, if the test piece is under stress the polarization of the wave must change with the distance $x$ along the direction of propagation. Such total change in phase difference introduced between the two components will depend upon three factors namely, the change in velocity per unit difference in stress in the two directions, the total distance travelled by the wave in the direction of propagation, and the wavelength of the sound in the test medium. The emergent wave, in view of the foregoing, contains information concerning these three factors and in particular, concerning the magnitude of the stress of the medium through which it has passed. To such phenomena we have given the term "acousto-elasticity."

Such theoretical considerations will be more readily apparent when taken in combination with the accompanying drawings.

In view of the foregoing, our basic system for ultrasonic stress analysis consists of an ultrasonic generator capable of producing transverse waves which are then propagated through the object under examination in combination with a detection system which is capable of resolving the polarization of the emergent ultrasonic wave.

FIGURE 1 schematically illustrates the components of an electronic system by which the instant process may be practiced. In this example of the process, two matched Y-cut quartz crystals, 11 and 12, which oscillate predominantly in shear, are coupled to opposite end faces of an aluminum bar test piece 13. The crystal 11 is used to generate the ultrasonic signal whereas crystal 12 is a receiver of the ultrasonic signal transmitted through the aluminum bar. In one application of our process such bar was five inches long and had a square cross-section one inch on a side. The crystals are so oriented with respect to the faces at the ends of the bar that the direction of motion of the crystals lie along parallel diagonals of these faces. The crystals in this particular instance are so oriented with respect to each other that if the medium 13 were stress-free the response of the receiving crystal 12 would be maximum. By the use of a suitable, standardly available, RF pulse generator 14, a pulsed high frequency voltage is impressed upon the sending, or generating crystal 11. Such crystal is coupled to said pulse generator in the standard manner to cause controlled oscillations of the former. The resulting crystal oscillations generate a transverse ultrasonic wave within the aluminum bar, the wave pulse of which travels through the bar and activates the receiving crystal. Upon such oscillator activation the piezoelectric crystal 12 generates a voltage which is amplified by the RF amplifier 15 and then presented, for example, on the oscilloscope 16. As in the case of the pulse generator, both the amplifier 15 and the oscilloscope 16 represent commercially available equipment, and are operatively connected in a known manner.

As it leaves the generating crystal 11, the ultrasonic wave is plane polarized and the direction of the displacement vector thereof is that of the principal motion of the crystal. If this direction is unaffected or turned through an angle of $n\pi$ radians of angle ($n=1, 2, 3, \ldots$), upon passage of the wave through the test piece to the receiving crystal 12 the response of the latter will be maximum. In general, because of the change in phase difference between the two components of displacement in the directions of principal stress the state of polarization of the wave will be changed (in a different way) upon passage through the stressed medium, and as a result the response of the receiving crystal 12 will be less than maximum. The exact magnitude of response (i.e., generated signal) of this crystal of the ultrasonic wave is related to the state of polarization of the wave when it reaches the crystal and by this means the response of the receiving crystal is related to the state of polarization of the wave and thus, in turn related to the stress present in the test media.

In a series of experiments, stress was applied to the upper face of bar 13 with a large hydraulic press capable of exerting a total force of approximately 96,000 pounds. The frequency impressed upon the generating crystal 11 by the RF pulse generator 14 was 7.01 mc.p.s. (megacycles per second), and the amplitude of the voltage response of the receiving crystal 12 was measured as the total stress applied to the bar was varied. In Table I below, the results obtained in two trials are presented. Trial No. 2 differs from Trial No. 1 in that the bar was rotated through 90° about its long axis to effectively double the range of variation of the angle of polarization for a given range of variation in applied stress.

TABLE I

| Gauge Reading | Total Load On the Bar (Pounds) | Stress/In.² (Pounds) | Response of Receiver (Volts) | |
|---|---|---|---|---|
| | | | Trial #1 | Trial #2 |
| 0 | 0 | 0 | .42 | .40 |
| 100 | 11,300 | 2,260 | .32 | .49 |
| 200 | 22,600 | 4,520 | .32 | .56 |
| 300 | 33,900 | 6,780 | .41 | .60 |
| 400 | 45,200 | 9,040 | .48 | .57 |
| 500 | 56,500 | 11,300 | .52 | .50 |
| 600 | 67,800 | 13,560 | .47 | .39 |
| 700 | 79,100 | 15,820 | .38 | .38 |
| 800 | 90,400 | 18,080 | .20 | .46 |

The data for Trials 1 and 2 are shown in the graph comprising FIGURE 2. The abscissa thereof represents gauge readings on the press which may be converted to total load on the bar in pounds by multiplication by a factor of 113, and to stress per square inch by division of this result by the area of the face of the aluminum over which the load was applied, namely, in this instance five square inches. Such conversions are presented in table I. In the graph, gauge readings to the right of the vertical axis correspond to loadings on one face of the bar (Trial No. 1) whereas those to the left of the vertical axis correspond to loadings on a second face whose normal makes an angle of 90° with that of the first (Trial No. 2). The data represents a rotation of the direction of polarization of the acoustic wave of the order of about 180° for a total stress variation of the order of (800×113)/5 or 18,000 lbs./sq. in. This corresponds to about 0.2% change in propagation or wave velocity with the application of 18,000 pounds per square inch or approximately 0.01% change in velocity per 1,000 pounds per square inch of applied stress.

It should be noted that the crystals were placed on the bar in such a manner as to produce a maximum signal with no external applied force. Any deviation from a maximum transmitted signal under these conditions indicate internal residual stresses. As can be seen in FIGURE 2, the pattern is displaced from the origin, indicating the residual stresses which were in the experimental bar, and since the stock from which the bar was formed was made by a rolling process it is to be expected that such residual stresses would exist. In the instant test piece sample the apparent magnitude of such residual stress is approximately 6,000 pounds per square inch.

Referring to this determination of residual stresses in somewhat more detail it should be recalled that in accordance with the present teachings if the sample being tested is completely stress-free, no changes occur in the polarization of the ultrasonic wave upon its passage through the sample and thus the response of the receiving crystal 12 must be a maximum under such circumstances. A glance at Table I and FIGURE 2 indicates that the response of the receiving crystal 12 of FIGURE 1 is not a maximum value when the applied stress is zero and from this fact the presence of residual stresses is deduced, a fact which is not particularly surprising since the test piece was cold worked prior to the herein reported analytical studies. From FIGURE 2 it is seen that an applied stress of 6,000 lb./in.² must be impressed upon the sample over a path length of one inch for the ultrasonic wave in order that the signal received by crystal 12 is a maximum. This factor implies that the aforeindicated amount of stress over a one inch path length is required to correct for the change in polarization attributable to the residual stresses within the sample over its entire length. However, there is somewhat of an ambiguity here—if the ultrasonic frequency is too high, the amount of applied stress necessary to bring the response of the receiving crystal to its first maximum may not be equivalent to the whole internal stress and the determination fall short of such whole value by adequate stress to carry the polarization of the ultrasonic wave through $n$ complete cycles where $n$ is some integer.

Such ambiguity question, however, is easily resolved with our technique for all that is required is a sweep through lower frequencies. As the frequency decreases the phase difference introduced by the residual stress proportionately decreases in accordance with the following equation:

$$\phi = d\ H(S) f$$

where $\phi$ is the phase difference introduced by stress $S$;
$d$ is the path length of the ultrasonic wave
$H(S)$ is a function of the stress expressing the difference in the velocities of the two components of the ultrasonic waves in terms of stress; and
$f$ is the frequency of the ultrasound.

As soon as the frequency is low enough so that the value of $\phi$ is less than 360° we can say that the residual stress is that stress required to bring the response of the receiving crystal to its first maximum. It is this property of ultrasonic generation, i.e., the possibility of a wide latitude in frequency which furnishes our method with another distinct advantage over the methods of photoelasticity in the measurement of residual stress. In the photoelasticity technique it is not possible to change the frequency of the radiation over the range required to reveal the magnitude of the residual stress, and as a consequence it is impossible by such technique to measure the magnitude of the residual stress within the sample. In comparison to photoelasticity, by the practice of the instant invention it is possible to determine the path integrated residual stress within any sample transparent to ultrasonic energy. In the aforedescribed experiments, for example, if we assume that the frequency is sufficiently low so that the first maximum output signal is truly due to the complete absence of an applied net stress within the sample the residual stress has an effective value of 6,000 lbs./in.².

The determination of the amplitude of the residual stress can also be made with our system without the utilization of an applied external stress. The change in polarization of the wave can be determined by a rotation of either the sending or receiving crystal relative to each other until the received signal is a maximum. The measurement of the angle of rotation required and a knowledge of the relationship $H(S)$ relating the difference of velocities in the two components and the stress for a given material provides the information required for using the equation, $\phi = d\ H(S) f$ to compute $S$. Again, the measured angle of rotation for maximum received signal may correspond to the complete internal stress or may differ from this by adequate stress to carry the polarization through $n$ complete cycles where $n$ is an integer. This question can readily be resolved by ranging through low enough frequencies. By first solving the foregoing equation using the low frequency values providing the magnitude of the internal stress; then by returning to operation with a higher frequency the accuracy of the stress measurement is increased.

An even more accurate determination of the residual stress may be made by increasing the frequency of the ultrasonic signal from 7 megacycles up through 1,000 megacycles per second or more. The practical lower frequency for use herewith is about 50 kc./second. As a practical matter, for the greatest accuracy in the preferred embodiment of our process 100 megacycles per second is utilized. Along these lines references should be had to the term "resolving power." By such term is meant the ability to differentiate between small differences in stress within the media. The amount of stress in a given path length is revealed by the stress produced change $\Delta\phi$, in phase difference between the two components of the acoustic wave in two mutually perpendicular directions. Since $\Delta\phi$ is proportional to the difference in stress in the latter two directions and to the frequency of the ultrasonic wave used herein, it follows that for high resolving power the frequency likewise must be high.

A major problem in the utilization of acoustic means of stress analysis is the display of the information in the emergent wave in a form that can be easily interpreted. If the stress pattern is essentially a two-dimensional one, it means that the state of polarization varies from point-to-point in the emergent wave front. The simplest, although perhaps not the most informative method to determine the state of polarization involves the use of a point-by-point probe technique with a small Y-cut quartz crystal, for example, to extract the needed information. In such particular instance, the probe would replace the receiving crystal 12 shown in FIGURE 1 and discussed above.

In order to better understand the techniques and problems involved in the determination of the state of polarization of the emergent ultrasonic wave, consideration should be given to the phenomena involved in the transmission of shear waves. In such a wave the particles comprising the medium move at right angles to the direction of wave propagation. When passed through a solid medium such waves may either exist only in a limited area or across the entire cross-section of a body depending upon the relative areas of the wave generation means and the parallel cross-section area of the medium. In more specific terms referring back to FIGURE 1, it is seen that the crystal 11 is smaller than the aluminum bar in two dimensions. On this basis, upon the impression of a voltage on the Y-cut crystal a transverse ultrasonic beam falling within the dotted lines 17 will pass through the bar 13. Thus, more generally, an ultrasonic wave beam is generated which assumes a cross-sectional shape substantially equivalent to the oscillatory face of the sending crystal. For those test pieces which have a comparatively small sectional area to be stress tested a sending crystal may be provided which completely blankets one face thereof and thus a transverse wave can be propagated which completely fills the piece.

As shown in FIGURE 1 the receiving crystal 12 because of acoustic polarization differences and thus voltage differences, only indicates whether or not the bar is being stressed, but because it abuts upon a considerable face area one is not able to specifically locate the stress concentration area. This problem is illustrated in FIGURE 3 which schematically discloses a receiving crystal 12 within the heavy lined area. For purpose of discussion, it is to be assumed that the generating crystal is in the same relative position at the opposite face of the bar 13. If there is merely a localized point of stress concentration in the bar, as indicated at the cross-hatched area 17, then under those circumstances the crystal 12 will only indicate that a stress is present and will quantitatively measure it in terms of voltage, but will not indicate the point in the cross-section where such stress is located. If on the other hand, the stress is localized to area 18 both the sending and the receiving crystals would have to be moved to send an ultrasonic beam therethrough or such stress would remain undetected.

The foregoing discussion is based upon the use of a receiver piezoelectric crystal having either both of its opposed, or at least one of its faces silvered or coated with conductive materials as is the usual construction whereby the sum total of the charge produced upon activation of the crystal is determined. It should be understood however that a comparatively large crystal may be utilized to detect areas of stress in addition to the degree of stress if such crystal is unsilvered whereby specifically activated areas of the crystal face are ascertained. By such a provision the need for a crystal mosaic or point probe is eliminated.

The point-by-point probe enables the operator to not only measure the stress but also to determine its sectional location within the test piece. It should of course be recalled that the ultrasonic beam must pass through the stress area, and to this end either the signal generating means blankets the entire cross-section of the piece or it must be moved in order that it may penetrate all of such area. The point-by-point probe is positioned at various areas on the opposite face of the bar as for example, A–1, B–1 . . . F–6. At each such point a voltage reading is taken and then such voltage is used to determine the presence of stress and the magnitude thereof.

In actual field operation once the instant device has been calibrated it may be desirable to first test for the presence of stress generally by the use of a comparatively large receiving means followed by the utilization of a small crystal point-by-point probe to pick out the specific stress area within the overall piece.

In another embodiment of our invention, as shown in FIGURE 4, a mosaic 19 of small Y-cut quartz crystals, or the like, is positioned at the signal receiving end of the test piece 13 and is used to extract the exit polarization information. The response of the crystal mosaic is then scanned by either mechanical or electrical scanning means which scanned information is then presented on a cathode ray tube.

The visual presentation of information contained in an ultrasonic wave as it emerges from a sample provides a difficult problem. Up to the present time this information has consisted of a variation in the intensity of the ultrasonic energy over the wavefront. Such variation is generally due to the presence within the sample of regions in which the ultrasonic energy has been absorbed and results in the so-called ultrasonic shadowgraph. The methods suggested to render the information visible have included those which depend upon the effects of ultrasound on photographic emulsions, the use of mosaics of small crystals and a read out of the response of each crystal, or a scanning of the surface of a receiving crystal by electronic or mechanical means. As an illustration of the latter technique we refer to the paper by F. E. Suckling and W. R. McLean in the Journal of the Acoustical Society of America, vol. 27, page 297 (1955). Although the information concerning the stress distribution within the sample in our invention is contained in a unique form, viz:, the variation over the wave front of the polarization of the ultrasound, yet these techniques may be suitably modified to afford a visual presentation of the information.

One method for obtaining a display of the stress pattern within a stressed body involves the use of what we have termed "acoustic fibers" in lieu of the receiving crystal 12 or the crystal mosaic 18. By an "acoustic fiber" we mean a rod of acoustically transparent material having one end flat and the opposed terminating face beveled so that the normal to its surface makes a fixed angle relative to the axis of the rod. A group of such rods as closely packed as their configuration will allow and with their flat faces all in one plane is herein termed an "acoustic fiber bundle." A typical orientation of the rods within the bundle will have the normals to their beveled faces all pointing in a fixed direction in space. If the flat surfaces of such bundle are adequately coupled to the exit surface of the stress sample, as through a fluid coupling, the ultra-sound will pass from such stressed sample to the fiber bundle with the same distribution of polarization over the wave front as it had upon incidence upon the exit surface of the stressed sample. That portion of the ultrasonic wave front with its specific state of polarization and incident upon a given fiber will travel through the fiber and be incident upon the beveled terminal face thereof. The ultrasonic energy transmitted through such face into the medium beyond, such medium being indicated by the numeral 34 in FIGURE 6, will depend upon the relative orientation of the displacement vector in the polarized sound and the normal to the exit surface of the individual fiber. In such a manner each rod produces within the medium just beyond its beveled face an intensity of ultrasonic energy which is dependent upon the state of polarization of the portion of the ultrasonic wave front incident upon its flat face from the exit surface of the sample. By such a phenomena the variation in polarization over the ultrasonic wave front incident upon the exit surface of the stressed sample is reproduced as a variation in ultrasonic energy within a layer of the medium 34 immediately adjacent to the exit faces of the fibers comprising the bundle.

It should be recalled that the variation in polarization within such exciting ultrasonic wave front is a reproduction of the variation of stress within the sample and therefore if such variation in intensity of sound in the medium 34 can be detected the variation of such stress within the test sample is revealed. It is known that in fluids the index of refraction of light is affected by the presence of the ultrasonic energy and that the change in such index varies with the intensity of the sound and on the basis of this the variation of intensity of ultrasonic energy in the liquid just beyond the exit faces of the acoustic fibers is mirrored in a variation of the index of refraction of the liquid.

In order to better understand such acoustic fiber concept and the instant acoustical-optical image converter the underlying theory should first be considered after which reference to FIGURES 5 and 6 should be had. It is known that ultrasonic shear waves which may only be propagated in solids due to the hithertofore mentioned elasticity requirement can transmit energy to a liquid at an interface between a solid and a liquid and that the energy transmitted into the liquid is in the form of the usual acoustic compressional wave. It is necessary for the transmission of energy from the shear wave into the liquid that the displacement of a solid media as the shear wave passes therethrough have a component normal to the liquid-solid interface. Such requirement is accomplished by having the plane of the interface at angle other than 90° to the direction of the propagation of the shear wave in the metal, as disclosed schematically in FIGURES 5 and 5A.

To elaborate somewhat upon these "acoustic fiber" sensors it should be recalled that when the polarized transverse ultrasonic wave has passed through the stressed sample and is incident upon the exit surface it sets each portion of that surface into motion, such motion being parallel to the wave front of the ultrasonic wave incident normally upon it. The motion of each element of the exit surface is thus determined by the polarization of that portion of the ultrasonic wave front incident upon it and this polarization, as discussed above, is dependent upon the character of the stress in magnitude and direction along the path within the sample traveled by such particular portion. In view of this it can thus be said that the exit surface of the sample exhibits an "acoustical image."

In FIGURES 5 and 5A the basic unit of an acoustical-optical image converter comprising an acoustic rod system is schematically disclosed. The acoustic rod which is illustrated is substantially square in cross-section and has a flat face 22 and a beveled end 23. Although the square-sectioned rod represents the preferred embodiment since such permits the closest packing, other sectional shapes may also be utilized as for example circular or hexagonal. It should be noted that the angle θ must be greater than 0° and less than 90° for an operative system to result. In FIGURE 5A the lines A—A and B—B relate to the direction of acoustic polarization. If the ultrasonic wave is polarized in the direction A—A, there results a maximum transmission through the exit face, that is the beveled face, of rod 21. If the wave is polarized in the direction B—B there will be no transmission of acoustic energy through the exit face. Therefore, the amount of ultrasonic energy transmitted by the rod into the liquid through the exit face depends upon the polarization of the wave front entering the entrance face of the rod. The refractive index of the liquid varies with the intensity of the ultrasonic energy within it and therefore reproduces the variation in intensity of energy entering it from the rod.

A multitude of the rods illustrated in FIGURE 5 are formed into the mosaic as shown in FIGURE 6. In such latter drawing, the specimen 31 to be stress tested has a Y-cut quartz crystal 32 or the like coupled to one end thereof. Such crystal upon appropriate energization serves as an ultrasonic wave generator and in all aspects is equivalent to the crystal 11 shown in FIGURE 1. On the opposed face of the specimen is positioned the acoustic rod mosaic 33 formed of a group of side by side arrayed rods 21. The flat ends of each rod abut directly upon the exit face of the test specimen 31 while the beveled ends thereof 23 all face in the same direction away from said exit face. It should be noted that in the drawing such acoustic rod mosaic lies within a transparent liquid 34 substantially to the depth shown whereas the flat end portions of such rods and the specimen are not submerged in such liquid.

The amount of energy which is transferred from the rods to the liquid depends upon the orientation of the angular ends of the individual rods with respect to the polarization of the testing sound wave. When the instant device is utilized in detecting stress patterns the variation in stress provides an acoustical image by polarizing the incident ultrasonic wave. The amount of energy transferred to the liquid, by the rods, is proportional to the vector component normal to said angular ends. This component is proportional to the degree of polarization of the ultrasonic wave. Hence, the polarization controls the amount of energy coupled to the liquid which in turn alters the refractive index of the liquid and by such alteration a visual stress of pattern is provided.

The pattern of variation of the index of refraction may be revealed optically in various ways. One method utilizes an optically transparent prism system in conjunction with the acoustic fibers as illustrated in FIGURE 7. The index of refraction of the prism 50 and that of the liquid 51 are so selected relative to each other that when no ultrasonic energy is present in the liquid light entering the prism in a direction normal to the entrance face thereof will be completely reflected by the prism-liquid interface. If ultrasonic energy is present in varying degrees in the liquid and thus the index of refraction thereof is locally altered this balance will be disturbed, and as a result the angle of incidence upon the prism-liquid interface in the area overlying this region will be less than critical and a portion of the light will pass into the liquid. This means that a portion of the light beam leaving the exit face of the prism will be less bright than its surroundings. In this manner the pattern of variation in the index of refraction of the liquid adjacent to the ends of the acoustic fibers will be revealed as a variation in intensity of the light emerging from the exit face of the prism.

It should also be understood that the instant acoustical-optical image converter may be used for flaw detection purposes. In this case, the system is adjusted for maximum transmission of ultrasonic energy and since a flaw blocks the transmission thereof certain rods receive no energy and thus display a pattern of the flaw.

In the art of photoelasticity use is made of what is there called a quarter wave plate. Such an element consists of an optically transparent material, for example, a calcite crystal which possess the added property of birefringence. If we assume that plane polarized light is incident normally upon a face of such crystal which face is parallel to the plane determined by the optical axis and the principal axis of the crystal and upon the further assumption that the direction of polarization of the light makes an angle of 45° with the optical axis of the crystal when incident thereon, then under such assumed facts that component of the light wave which lies in the fast principal plane has a greater velocity than that component lying in the slow principal plane and a phase difference between the two components is introduced as the light passes through the crystal. If such crystal is of such thickness that a phase difference of $\pi$ radians results, the light will exit from the crystals circularly polarized.

A similar result can be achieved acoustically if an acoustically transparent medium is uniformly stressed and so oriented with respect to the incident plane polarized ultrasonic wave that the direction of polarization of the wave makes an angle of 45° with the principal axis of stress in the medium. The thickness of the plate is so selected that a change of $\pi$ radians in phase difference is introduced. Such thickness $d$ is determined by the following formula:

$$d = \frac{C_e C_s}{4f(C_e - C_s)}$$

where $C_e$ is the velocity of the component in the plane of maximum stress, $C_s$ is the velocity of the component in the plane of minimum stress, and $f$ is the frequency of the ultrasonic wave. Such value of $d$ is the minimum thickness that will produce a circularly polarized wave at the exit face of the crystal. Any odd integral multiple of this distance or thickness also serves to produce circularly polarized sound, and thus if it is desired to produce a phase change of other than 90° between the two components it is only necessary to select an appropriate plate or crystal thickness.

In general terms, the magnitudes of $C_e$ and $C_s$ will depend upon the magnitude of the stress in the direction of principal stress and upon the relationship between applied stress and modulus of shear in these two directions. For any given material of which the construction of the plate or crystal is selected the values of $C_e$ and $C_s$ may be measured by an application of the instant procedure for stress analysis in order to find a specific choice for the principal axis of stress. Such latter choice is simply a function of the selection of direction of an externally and uniformly applied stress. Any material which is transparent to sound such as metals in general and further which is homogeneous with respect to its elastic properties may be a suitable material from which to make the instant quarter wave plate. We preferably select a bar of the material having a rectangular cross-section and of such length as to correspond to the value $d$ or an integral multiple thereof obtained by the formula above. It is to be noted that the value of $d$ depends upon $C_e$ and $C_s$ which in turn depend ultimately upon the magnitude and direction of the applied stress. If the plate material is essentially isotropic for example, as in the case of the polycrystalline metal of fine grain structure, then a uniform stress applied to one edge of the plate will produce an homogeneous stress field at each point of which the principal axis of maximum stress will lie in the direction of applied stress. In view of this it is possible to so vary the magnitude continuously so as to produce the correct values of $C_e$ and $C_s$ for a given frequency and for a given value of $d$.

From the foregoing it should be evident that the hereindisclosed acoustical quarter wave plate may be readily utilized in the stress testing of elastic materials.

It will be understood that modifications and variations may be effected without departing from the spirit or scope of the novel concepts of the present invention.

We claim as our invention:

1. In a method for determining the stress in a solid, including residual stress, wherein the extent of change in wave polarization for differently applied stresses is known for such solid, comprising the steps of: orienting a first shear wave transducer to one face of said solid; orienting a second shear wave transducer to the opposite face of said solid in a manner whereby the preferred directions of vibration of said first and second transducers are the same; energizing said first transducer to transmit ultrasonic shear waves through said solid; connecting said second transducer to a voltage indicator; rotating said second transducer until a maximum amplitude signal is received; and measuring the angular excursion of said second transducer required to obtain said maximum signal.

2. In a method for determining the stress in a solid, including residual stress, wherein the extent of change in wave polarization for differently applied stresses is known for such solid, comprising the steps of: orienting a first shear wave transducer to one face of said solid; orienting a second shear wave transducer to the opposite face of said solid in a manner whereby the preferred directions of vibration of said first and second transducers are the same; energizing said first transducer to transmit ultrasonic shear waves though said solid; connecting said second transducer to a voltage indicator; rotating said second transducer until a maximum amplitude signal is received; measuring the angular excursion required of said second transducer to obtain said maximum signal; and lowering the frequency of said waves to a value where rotation of said second transducer to obtain maximum output voltage results in a phase difference $\phi$ due to any stress in the solid is less than $2\pi$ radians in accordance with the relation $\phi = dH(S)f$ where $d$ is the path length of the wave through the solid, $H(S)$ is a function of the stress expressing the difference in velocities of the orthogonal components of the wave in terms of stress and $f$ is the frequency of the wave.

3. In a method for determining the amount of stress in a solid in terms of the change in polarization of an ultrasonic shear wave passing therethrough, including residual stress, comprising the steps of: orienting a first shear wave transducer to one face of said solid; orienting a second shear wave transducer to the opposite face of said solid in a manner whereby the preferred directions of vibration of said first and second transducers are the same; energizing said first transducer to transmit ultrasonic shear waves through said solid; connecting said second transducer to a voltage indicator; applying a load across said solid in a first direction and recording the value of output voltage from said second transducer; successively increasing the value of said load and recording the corresponding output voltages with respect thereto; removing said load and applying it across said solid in a second direction at right angle to said first direction; and successively increasing the value of said load in said second direction and recording the output voltage for each particular load.

4. In a method for determining the amount of stress in a solid in terms of the change in polarization of an ultrasonic shear wave passing therethrough, including residual stress, comprising the steps of: orienting a first shear wave transducer to one face of said solid; orienting a second shear wave transducer to the opposite face of said solid in a manner whereby the preferred directions of vibration of said first and second transducers are the same; energizing said first transducer to transmit ultrasonic shear waves through said solid; connecting said second transducer to a voltage indicator; applying a load across said solid in a first direction and recording the value of output voltage from said second transducer; successively increasing the value of said load and recording the corresponding output voltages with respect thereto; removing said load and applying it across said solid in a second direction which is at right angles to said first direction; successively increasing the value of said load in said second direction and recording the output voltage for each particular load; lowering the frequency of said waves to a frequency where a phase difference $\phi$ due to any stress in the solid is less than $2\pi$ radians in accordance with the relation $\phi = dH(S)$ where $d$ is the path length of the wave through the solid, $H(S)$ is a function of the stress expressing the difference in velocities of the orthogonal components of the wave in terms of stress and $f$ is the frequency of the wave; and again recording the values of output voltage from said second transducer for the same loads as applied in said first and second directions.

5. Apparatus for detecting the presence and magnitude of stress in a solid test sample comprising in combination: means for generating ultrasonic shear waves with said means in contact with a face of said test sample for coupling the waves thereto; an array of "acoustic fibers" having flat end faces in intimate contact with the sample to receive said waves passing therethrough and with opposite end faces parallel to each other and bevelled at an angle which determines the amount of wave transmission therethrough depending upon the angular polarization of said waves wherein said angle of polarization is changed by the presence of stress in the sample; and a liquid medium having light passing therethrough which medium has an index of refraction which varies with respect to the amount of wave energy passing therein coupled to the parallel bevelled ends of said fibers whereby the amount of light energy passing through the medium is proportional to the amount of wave energy normal to the bevelled end faces that is transferred into said medium.

6. Apparatus for detecting the presence and magnitude of stress in a solid test sample comprising in combination: means for generating ultrasonic shear waves with said means in contact with the surface of said sample to transmit shear waves through the sample; an array of "acoustic fibers" having flat end faces in contact with said sample to receive the waves passing therethrough and with opposite faces which are bevelled, all at the same angle so that such faces are parallel to each other, which angle is between 0° and 90° with respect to the longitudinal axis of said fibers; and a liquid medium having light passing therethrough whose index of refraction varies in proportion to the wave energy present in said medium and in contact with the parallel bevelled ends of said fibers whereby the amount of sonic waves coupled to the medium by the fibers is dependent upon the magnitude of the component of the wave which is normal to the bevelled end faces which component is dependent on the presence of stress in the sample.

7. An "acoustic fiber bundle" for coupling sonic energy from a first medium to a second medium wherein the refractive index of said second medium varies in proportion to the amount of sonic energy passing therethrough, comprising in combination: a multiplicity of substantially stress free acoustically transparent rods, all of the same length, having flat end faces in the same plane at one end thereof and bevelled parallel end faces at the other end thereof to transform shear wave energy passing into said rods at the flat end faces from said first medium into compressional wave energy passing out of said rods at the bevelled end faces and representing that component of said shear wave that is normal to said bevelled end faces, wherein the slope of said bevelled end faces is $90° - \theta$ with $\theta$ ranging between 0° and 90° with respect to the longitudinal axes of said rods.

References Cited in the file of this patent

UNITED STATES PATENTS

| | | |
|---|---|---|
| 2,700,895 | Carson | Feb. 1, 1955 |
| 2,723,556 | Willard | Nov. 15, 1955 |
| 2,906,117 | Kennard | Sept. 29, 1959 |

FOREIGN PATENTS

| | | |
|---|---|---|
| 903,922 | France | Feb. 12, 1945 |

OTHER REFERENCES

Article by Johnson et al.: Journal of Applied Physics, vol. 23, No. 5, May 1952, pp. 574–577. (A photostat copy is in 73–67.5.)

Article by Hikata et al.: Journal of Applied Physics, vol. 27, No. 4, April 1956, pp. 396–400. (A photostat copy is in 73–67.5.)